United States Patent [19]
Rau et al.

[11] Patent Number: 5,030,970
[45] Date of Patent: Jul. 9, 1991

[54] MICROFILM PRINTER WITH MICROVALUE PIXEL GENERATION

[75] Inventors: Fritz Rau, Unterhaching; Hans J. Vedder, Puchheim, both of Fed. Rep. of Germany

[73] Assignee: AGFA-Gevaert AG, Leverkusen, Fed. Rep. of Germany

[21] Appl. No.: 379,801

[22] Filed: Jul. 13, 1989

[30] Foreign Application Priority Data

Aug. 3, 1988 [DE] Fed. Rep. of Germany ....... 3826375

[51] Int. Cl.$^5$ .............................................. A04N 1/21
[52] U.S. Cl. ..................................... 346/108; 350/356
[58] Field of Search ........................... 346/107 R, 108; 350/356, 360

[56] References Cited

U.S. PATENT DOCUMENTS 4,532,526  7/1985  Behrens et al. ................. 346/107 R
4,591,260  5/1986  Yip ....................................... 346/160

OTHER PUBLICATIONS

G. Wessel, "Electro-Optical (PLZT) as Light-Gate Array for Non-Impact Printer", Research Center, Standard Elektrik Lorenz AG.
SELFOC Lens Array (SLA), Nippon Sheet Glass Co., Ltd., Tokyo, Japan.
Transparente Keramik für Elektro-Optische Anwendungen, A. Gutu-Nelle, H. Schichl, J. Springer, Standard Elektrik Lorenz AG.

Primary Examiner—Mark J. Reinhart
Attorney, Agent, or Firm—Michael J. Striker

[57] ABSTRACT

A microfilm printer with microvalue pixel generation comprises means for converting digital image values supplied to a computer into light signals, optical means for indicating the light signals on a microfilm per each micro image linearly, the converting means including a light valve line with light valve line elements controlled by the computer, the optical means including a reducing optical element.

14 Claims, 1 Drawing Sheet

MICROFILM PRINTER WITH MICROVALUE PIXEL GENERATION

BACKGROUND OF THE INVENTION

The present invention relates to a computer output microfilm printer. More particularly, it relates to a computer output microfilm printer in which digital image values supplied to a computer are converted into light signals and indicated on a microfilm per each micro image by lines with of an optical element.

Computer output microfilm printers which are presently on the market operate in accordance with two different principles. In accordance with one principle, the digital image values are converted by means of a cathode tube into a visible image and then photographed through a reducing optical element onto a microfilm. In accordance with the other principle the conversion is performed by a laser beam scanner which is controlled in correspondence with the digital image values, and the image is indicated on a microfilm by an optical element. Both methods lead to expensive and complicated devices, since both cathode tube pipe and also laser beam scanner are very expensive equipment parts. In the event of the laser devices, in addition for realizing of the so-called "cross-scan" and for reaching a uniform "begin of scan", additionally high grade and expensive optical arrangements are needed.

SUMMARY OF THE INVENTION

Accordingly, it is an object of the present invention to provide a computer output microfilm printer which avoids the disadvantages of the prior art.

More particularly, it is an object of the present invention to provide a computer output microfilm printer which operates on a different principle and therefore provides for considerable simplification of the apparatus parts and, as a result, a cost favorable realization of the printer.

In keeping with these objects and with others which will become apparent hereinafter, one feature of the present invention resides, briefly stated, in a computer output microfilm printer in which a light valve line is provided for conversion of digital image values into light signals and has a plurality of light valve line elements controlled by a computer, and the optical element which indicates on a microfilm each micro image is formed as a reducing optical element, for example a reducing objective.

Due to the utilization of a light valve line, the known expensive parts of the computer output microfilm printer such as image tubes or laser beam scanners are replaced with the relatively price-favorable light valve line arrangement. Also, the optical construction required for the reducing focusing is limited to several simple and conventional structural elements such as a raster objective, a matted disc, in some cases with a pivoting mirror and a conventional reducing objective.

In accordance with another feature of the present invention, the light valve line includes a plurality of pixels which are arranged near and/or above and below one another, and their transmission is controllable independently of one another.

Still another feature of the present invention is that the pixels are composed of a material which under the action of an electrical voltage turn the polarization plane of a light passing through the pixels, and the pixels are arranged between two intersecting polarization filters.

Still another feature of the present invention is that a point-shaped or a line-shaped light source is used for illuminating the pixels.

In accordance with a further feature of the present invention, in the event of the utilization of a point-shaped light source, a transverse converter in form of a glass fiber optical element is arranged between the light source and the light valve line so as to convert the point-shaped light source into a line-shaped light source.

A further feature of the present invention is that a raster objective or a gradient optical element with a 1:1 projecting scale is arranged between a polarization filter located after the light valve line and the reducing optical objective and then a matted disc is arranged.

In accordance with an additional feature of the present invention, the ground disc is operative for converting a not Lambert radiation into a Lambert light source.

A pivoting mirror can be arranged between the matted disc and the reducing objective.

Finally, the microfilm after the line illumination of a micro image by each image field is transportable by a known film transport means.

The term "light valve" is used here to identify a photoelectric transducer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a perspective view showing one embodiment of a computer output microfilm printer in accordance with the present invention, wherein conventional parts are not shown for the sake of simplicity.

DESCRIPTION OF A PREFERRED EMBODIMENT

Figure 1:
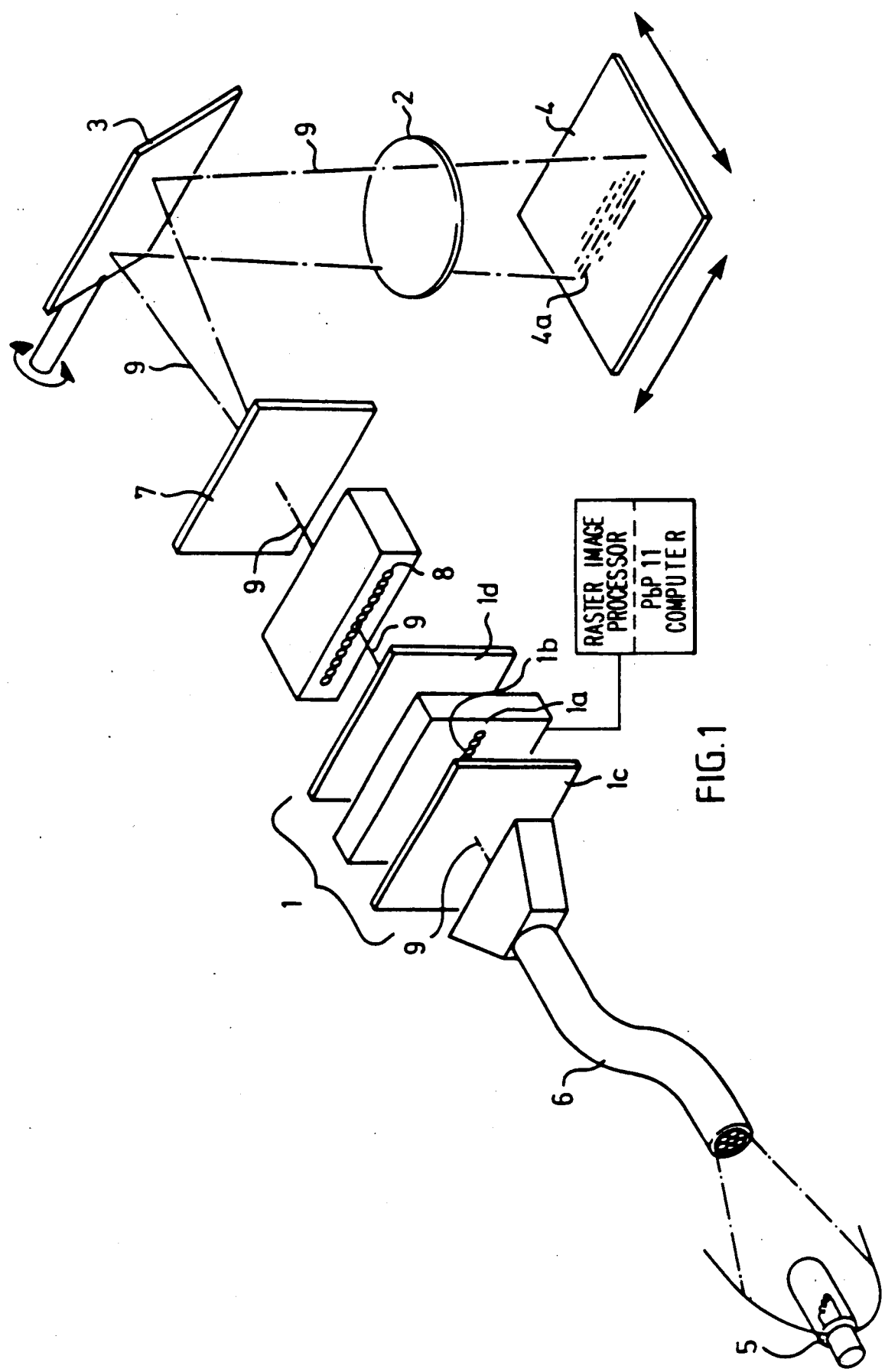

A microfilm printer in accordance with the present invention has conventional structural elements such as for example, film transporting means, pivoting mirror control means or control computer such as PDP11 computer with a Raster Image Processor. The control computer is connected with the light valve exposure unit 1 of the microfilm printer. The microfilm printer further includes a imaging optical unit 2. The imaging optical unit 2 is a high-resolution reduction optical device. The imaging optical unit 2 is combined with a pivoting mirror unit 3 for projecting a uni-dimensional light valve on a two-dimensional microfilm side 4a of a microfilm 4. A core of the light valve exposure unit 1 is a light valve line 1a on electro-optical basis, or so-called PLZT. PLZT is a conventional Light-Gate Array operable in us-range. It is composed of a plurality of individual elements (pixels) 1b arranged adjacent to each other. Their transmission can be controlled independently of one another by opening and closing an individual pixel. The light valve line 1a operates in the following manner:

The light valve elements 1b are formed of materials which upon applying an electrical voltage are in the condition that they rotate the polarization plane of the light passing through these light valve elements 1b. The angle of rotation depends on the magnitude of the applied voltage, or so-called tor voltage. If such a light valve is positioned between two mutually intersecting polarization filters 1c and 1d, then by varying the voltage applied to the light valve element 1b the light transmision through the arrangement can be controlled. In the case of the above described microfilm utilization the binary light modulation or in other words the exchange between fully closed and fully opened light valves is desired. Since the individual light valve elements 1b are responsive individually, it is possible to reduce in this manner a line with rastered (grid-like) image information.

A point or line-shaped light source 5 is provided for exposure the light valve illuminating unit 1. In the case of a point light source, a so-called transverse converter 6 (glass fiber optical element) must be additionally used before the light valve 1 for transforming the point light source into a line light source. The light valve line 1a is then positioned immediately between both intersecting polarization filters 1c and 1d. The information or signal transmission is performed by respective voltage control of the light valve individual pixels 1b. After the light valve 1, a 1:1 projection of the light valve element 1b onto a matted disc 7 occurs. For this purpose a correspondingly matching raster optical element, for example, gradient optical element is used. By projecting the light valve pixel on the matted disc 7, a quasi-Lambert secondary light source of the light valve 1 is produced. Then it is projected through the following imaging optical element 2 onto the microfilm 4. For a pixel 1b, an illuminating beam cylinder or cone is provided and identified with reference numeral 9.

The reducing imaging optical element 2 is located after the light valve illuminating unit 1. Its projecting scale is selected so that the format of the light valve line 1a is reduced to the desired microfilm format. For producing the side displacement of the original, or in other words, the transformation of the uni-dimensional light valve line 1a into the two-dimensional micro image format, a pivoting mirror 3 is arranged before the imaging optical element 2. Thereby, the image information present in a computer in a digital form project a complete original side on a micro image 4a in a light valve lines manner one after the other. Another possibility for the producing of the lines displacement is a vertical displacement of the whole light valve illuminating unit 1. Thereby the pivoting mirror 3 before the imaging optical element 2 can be dispensed with.

The transportation of one microfilm image 4a of the microfilm 4 to the next one can be performed both by corresponding translation of the not shown film gate, and also the projecting optics. The shown embodiment with the pivoting mirror 3 for the line displacement is advantageous as compared with the movement of the whole light valve exposure unit 1 together with the optical elements 8, 7, 2 in that the smaller masses and only one part must be moved. This is especially advantageous in the event of high projection speeds.

The arrangement of the matted disc 7 is especially important. For this purpose it must have a known special design, since the pixel 1b are not Lambert light sources, and for obtaining a uniform brightness of the pixel image projected on a micro image 4a, its conversion into the Lambert light sources is required. The optical element 8 is a conventional SELFOC Lens Array (SLA).

It will be understood that each of the elements described above, or two or more together, may also find a useful application in other types of constructions differing from the types described above.

While the invention has been illustrated and described as embodied in a computer output microfilm printer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A microfilm printer, comprising a light valve exposure means for converting digital image values into light signals and including a light valve line with a plurality of light valve line elements; computer means for controlling light signals emitted from said plurality of light valve line elements in accordance with digital image values supplied to said computer; and optical means for linewise forming a microimage on a microfilm, said optical means including a pivotable mirror for directing the light signals emitted from said plurality of light valve line elements onto the microfilm, means for transmitting the light signals emitted from said plurality of light valve line elements onto said pivotable mirror, and high resolution reduction optical means located between said pivotable mirror and the microfilm, said transmitting means including an optical element with a 1:1 projecting scale arrange after said light valve exposure means, and a matted disc located after said optical element.

2. A microfilm printer as defined in claim 1, wherein said light valve line elements are pixels.

3. A microfilm printer as defined in claim 1, wherein said plurality of light valve line elements comprises a plurality of pixels, said pixels being arranged adjacent to one another, transmissions, of said pixels being controllable independently from one another.

4. A microfilm printer as defined in claim 2, wherein said pixels are composed of a material which upon application of an electrical voltage turn a polarization plane of light which passes through said pixels.

5. A microfilm printer as defined in claim 4, wherein said light valve line has two intersecting polarization filters between which said pixels are arranged.

6. A microfilm printer as defined in claim 3, and further comprising a light source for illuminating said pixels.

7. A microfilm printer as defined in claim 6, wherein said light source is a point-shaped light source.

8. A microfilm printer as defined in claim 6, wherein said light source is a line-shaped light source.

9. A microfilm printer as defined in claim 7, and further comprising a transverse converter arranged between said light source and said light valve line for converting said point-shaped light source into a line-shaped light source.

10. A microfilm printer as defined in claim 9, wherein said transverse converter is formed as a glass fiber optical element.

11. A microfilm printer as defined 1, wherein said optical element is a raster

12. A microfilm printer as defined in claim 1, wherein said optical element is a gradient optical element 13. A microfilm printer as defined in claim 1, wherein said matted disc is an element which converts a not Lambert radiation into a Lambert light source.

14. A microfilm printer as defined in claim 1, and further comprising film transporting means arranged so that a microfilm after a line illumination of a micro image for each image field is transported by said film transport means.

* * * * *